United States Patent
Nogami et al.

(10) Patent No.: US 7,434,379 B2
(45) Date of Patent: Oct. 14, 2008

(54) APPARATUS FOR VERTICALLY MOVING MOWER UNIT FOR RIDING MOWER

(75) Inventors: Kazuaki Nogami, Sakai (JP); Yoshikazu Togoshi, Osaka (JP)

(73) Assignee: Kubota Corporation, Osaka (JP)

( * ) Notice: Subject to any disclaimer, the term of this patent is extended or adjusted under 35 U.S.C. 154(b) by 38 days.

(21) Appl. No.: 11/714,092

(22) Filed: Mar. 5, 2007

(65) Prior Publication Data
US 2007/0271895 A1  Nov. 29, 2007

(30) Foreign Application Priority Data
May 26, 2006  (JP)  ............................... 2006-146958

(51) Int. Cl.
*A01D 34/00* (2006.01)
(52) U.S. Cl. ...................................... 56/17.1
(58) Field of Classification Search ................. 56/17.1, 56/17.2, 320.1, 15.2, 11.1, 16.3, 10.8, 6, 56/7
See application file for complete search history.

(56) References Cited

U.S. PATENT DOCUMENTS

| | | | |
|---|---|---|---|
| 3,633,699 A * | 1/1972 | Bishop et al. .............. | 180/53.1 |
| 4,395,865 A * | 8/1983 | Davis et al. .................. | 56/13.3 |
| 5,138,825 A * | 8/1992 | Trefz et al. .................... | 56/11.1 |
| 5,351,467 A * | 10/1994 | Trefz et al. .................... | 56/16.3 |
| 5,695,023 A | 12/1997 | Knurr | |
| 5,927,055 A * | 7/1999 | Ferree et al. ................. | 56/15.9 |
| 6,494,028 B2 * | 12/2002 | Moore ...................... | 56/17.1 |
| 6,588,188 B2 * | 7/2003 | Dennis ........................ | 56/16.3 |
| 6,837,032 B1 * | 1/2005 | Swartzendruber et al. .... | 56/14.9 |
| 6,973,768 B2 * | 12/2005 | Samejima et al. ............ | 56/16.7 |
| 2007/0012016 A1 * | 1/2007 | Strope ........................ | 56/17.1 |
| 2007/0169456 A1 * | 7/2007 | Komorida et al. ........... | 56/17.1 |

FOREIGN PATENT DOCUMENTS

| | | | |
|---|---|---|---|
| EP | 1277384 A1 * | 1/2003 | |
| JP | 2002-238325 | 8/2002 | |
| JP | 2005-88628 | 4/2005 | |
| JP | 2005198587 A * | 7/2005 | |

* cited by examiner

Primary Examiner—Árpád Fábián-Kovács
(74) Attorney, Agent, or Firm—The Webb Law Firm (57) ABSTRACT

A riding lawn mower vehicle having a riding traveling vehicle body and a mower operatively connected via a lifting/lowering link mechanism to the vehicle body to be lifted and lowered relative thereto, the mower vehicle comprising: a pair of right and left hand-operated traveling control members; a lifting control pedal having a lifting stepping face and configured to cause the mower to be lifted; a lowering control pedal having a lowering stepping face and configured to cause the mower to be lowered; and the lifting stepping face and the lowering stepping face being located laterally to each other on a floor of a driving section of the riding traveling vehicle body.

8 Claims, 7 Drawing Sheets

APPARATUS FOR VERTICALLY MOVING MOWER UNIT FOR RIDING MOWER

BACKGROUND OF THE INVENTION

The present invention relates to a riding lawn mower vehicle having a riding traveling vehicle body and a mower operatively connected via a lifting/lowering link mechanism to the vehicle body to be lifted and lowered relative thereto. The invention relates, more particularly, to a mower for use in such riding lawn mower vehicle.

A conventional riding lawn mower vehicle is known from e.g. JP 2002-238325. In this, the mower is lifted/lowered by a manual operation of a lifting/lowering lever provided on a right lateral side of a driver's seat.

With the riding lawn mower vehicle disclosed in the above-cited document, for improvement of maneuverability of the traveling vehicle body, right and left rear wheels are driven independently of each other and control levers provided on the right and left sides of the driver's seat are gripped and operated respectively by right and left hands for effecting a forward traveling, a reverse traveling and a turning operation. On the other hand, a lifting/lowering operation of the mower is effected by operating a lifting/lowering lever provided on a lateral side of the driver's seat with the right or left hand.

If a lifting/lowering operation of the mower is to be effected during traveling, an operation of the lifting/lowering lever is needed in addition to operations of the control levers. However, as the operator grips the control levers with both hands, the operation of the mower lifting/lowering lever is difficult. For this reason, when a mower lifting/lowering operation is to be effected, the operator needs to once suspend the traveling of the riding lawn mower vehicle and then operate the lifting/lowering lever. This hinders efficient lawn mowing operation.

SUMMARY OF THE INVENTION

In view of the above-described state of the art, the object of the present invention is to improve the controllability of the riding lawn mower vehicle, thus allowing efficient lawn mowing operation.

According to the present invention, a riding lawn mower vehicle having a riding traveling vehicle body and a mower operatively connected via a lifting/lowering link mechanism to the vehicle body to be lifted and lowered relative thereto, the mower vehicle comprising:

a pair of right and left hand-operated traveling control members;

a lifting control pedal having a lifting stepping face and configured to cause the mower to be lifted;

a lowering control pedal having a lowering stepping face and configured to cause the mower to be lowered; and the lifting stepping face and the lowering stepping face being located laterally to each other on a floor of a driving section of the riding traveling vehicle body.

DETAILED DESCRIPTION OF THE PREFERRED EMBODIMENTS

Next, embodiments of the invention will be described with reference to the accompanying drawings.

Figure 1:
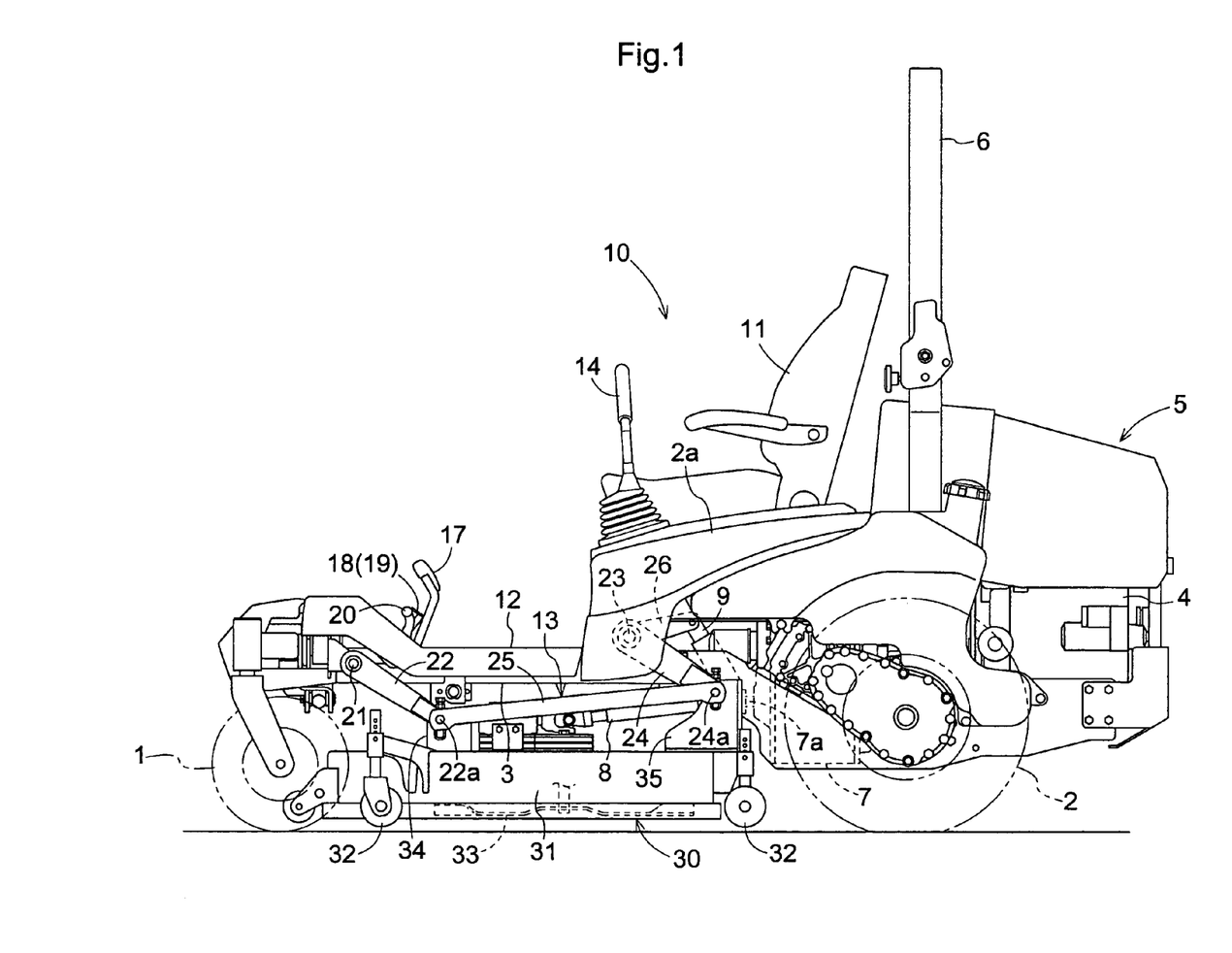
FIG. 1 is a general left side view of a riding type lawn mower vehicle.
Figure 2:
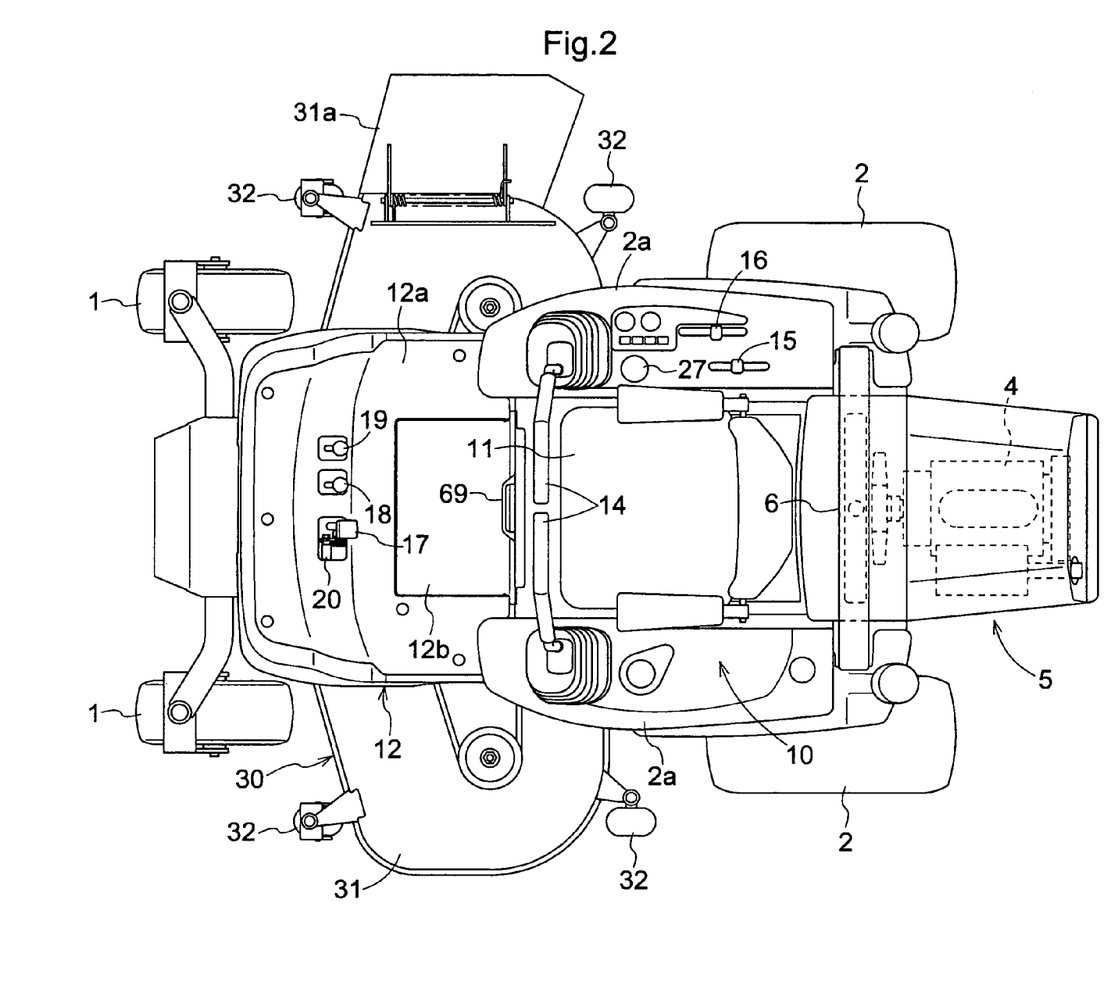
FIG. 2 is a general plan view of the riding lawn mower vehicle.

As shown in FIGS. 1 and 2, a riding type lawn mower vehicle includes a pair of right and left caster-wheel type, freely rotatable front wheels 1, a pair of right and left drivable rear wheels 2, an engine section 5 mounting an engine 4 on a rear end of a vehicle frame 3, a driving section 10 having a driver's seat 11 located forwardly of the engine section 5, a roll-over protection (ROPS) frame 6 provided rearwardly of the driver' seat 11, and a mower 30 operatively connected via a lifting/lowering link mechanism 13 between the front wheels 1 and the rear wheels 2. Power of the engine 4 is transmitted from a power takeoff shaft 7a extending forwardly from a transmission case 7 to which the right and left rear wheels 2 are supported, via a rotational shaft 8 to the mower 30, whereby the mower 30 is driven.

This lawn mower vehicle is used for lawn mowing or grass mowing operation. To this end, as a hydraulic lifting/lowering cylinder 9 disposed downwardly of the driver's seat 11 is expanded or contracted, via the lifting/lowering link mechanism 13, the mower 30 is lowered to a lowered working condition in which gauging wheels 32 disposed at front and rear portions of a cutter blade housing 31 of the mower 30 are placed in contact with the ground surface or lifted to a lifted non-working condition in which the gauging wheels 32 are lifted up off the ground surface. When the self-propelling vehicle body is traveled with setting the mower 30 under the lowered working condition, the mower 30 will effect a lawn or grass mowing operation at a plurality of positions inside the cutter blade housing 31 by means of cutter blades 33 rotatably driven about vertical axes in the cutter blade housing 31. And, with air drafts generated with rotations of the respective cutter blades 33, mowed grass or lawn will be carried to the right lateral side of the cutter blade housing 31 to be discharged through a discharging outlet 31a to the outside of the cutter blade housing 31.

As shown in FIG. 2, the driving section 10 of the self-propelling vehicle body includes the driver's seat 11 disposed between right and left rear wheel fenders 2a, and a driving section floor 12 provided forwardly and downwardly of the driver's seat 11 and supported on the vehicle frame 3.

On opposed lateral sides of the driver's seat 11, there are provided a pair of control levers 14 (example of "a pair of right and left hand-operated traveling control members"), and on the right side of the driver's seat 11, there are provided an accelerating lever 15 and a work clutch lever 16. Further, a lower limit adjusting tool 27 is provided forwardly of the accelerating lever 15. With a dial operation of this lower limit adjusting tool 27, the lower limit of the lawn mowing height of the mower 30 can be adjusted. In a front area of the driving section floor 12, there are arranged, in the order from the right side, a lowering control pedal 19, a lifting control pedal 18, a brake pedal 17 and a parking brake pedal 20 side by side along the right/left direction (i.e. the lateral direction). With this layout, an operator seated at the driver's seat 11 will place his/her right foot on the driving section floor 12 (right footrest) on the right side of the lowering control pedal 19 and place his/her left foot on the driving section floor 12 (left footrest) on the left side of the parking brake pedal 2, and effect operations of the lowering control pedal 19, the lifting control pedal 18, the brake pedal 17 and the parking brake pedal 20. As a result, the operator can operate the lowering control pedal 19, the lifting control pedal 18 and the brake pedal 17 with one foot (in this case, the right food). Therefore, the a lowering stepping face 19a of the lowering control pedal 19, a lifting stepping face 18a of the lifting control pedal 18 are located lateral to each other and preferably spaced apart laterally although they may be touching to the extent that would not impede operation of each pedal.

The accelerating lever 15 is provided for effecting an accelerating operation of the engine 4. The work clutch lever 16 is provided for driving or stopping the mower 30 by engaging/disengaging the power from the engine 4 by means of a work clutch (not shown) included in the transmission case 7. The brake pedal 17 is provided for braking the right and left rear wheels 2 by means of rear wheel brakes 29 as an example of brakes provided on the opposed lateral sides of the transmission case 7 (see FIG. 5). The parking bake pedal 20 is provided for maintaining a stepped-on condition of the brake pedal 17.

The right and left control lever 14 are operatively and respectively coupled with speed changing portions of a pair of hydrostatic stepless speed changing devices (not shown) provided in the transmission case 7 for transmitting the drive force from the engine 4 to the right and left rear wheels 2 individually. That is, when the left control lever 14 is pivotally operated in the fore and aft direction of the vehicle body, a speed changing operation of the hydrostatic stepless speed changing device associated with the left rear wheel 2 is effected. Similarly, when the right control lever 14 is pivotally operated in the fore and aft direction of the vehicle body, a speed changing operation of the hydrostatic stepless speed changing device associated with the right rear wheel 2 is effected. Accordingly, if the right and left control levers 14 are pivotally operated in the same forward or rearward direction at one time, the vehicle body will travel forwardly or reversely. When the right and left control levers 14 are pivotally operated in the different or opposite directions, the vehicle body will make a right or left turn.

As shown in FIG. 1, the lifting/lowering link mechanism 13 includes a pair or right and left front pivotal links 22 pivotally supported to a vehicle body wise transverse rotational support shaft 21 disposed at a front end portion of the vehicle frame 3, and a pair of right and left rear pivotal links 24 pivotally supported to a vehicle body wise transverse rotational support shaft 23 downwardly of the driver's seat 11 on the opposed lateral sides of the vehicle frame 3. Lower end portions of the right and left front pivotal links 22 are pivotally connected via connecting pins 22a to a front connecting bracket 34 of the cutter blade housing 31. Lower end portions of the right and left rear pivotal links 24 are pivotally connected via connecting pins 24a to a rear connecting bracket 35 of the cutter blade housing 31. Between and across the connecting pins 22a and the connecting pins 24a, there are provided right and left coupling links 25. To a center portion of the rotational support shaft 23, there is affixed a link driving arm 26, to which a cylinder rod of a lifting/lowering cylinder 9 is operatively connected.

With the above, in response to an expansion or retraction of the lifting/lowering cylinder 9, the rotational support shaft 23 is rotated via the link driving arm 26, whereby the right and left rear pivotal links 24 are pivoted up/down relative to the vehicle frame 3 and further the right and left pivotal links 22 are pivoted up/down via the right and left coupling links 25. Consequently, the mower 30 is lifted or lowered relative to the vehicle body.

Figure 3:
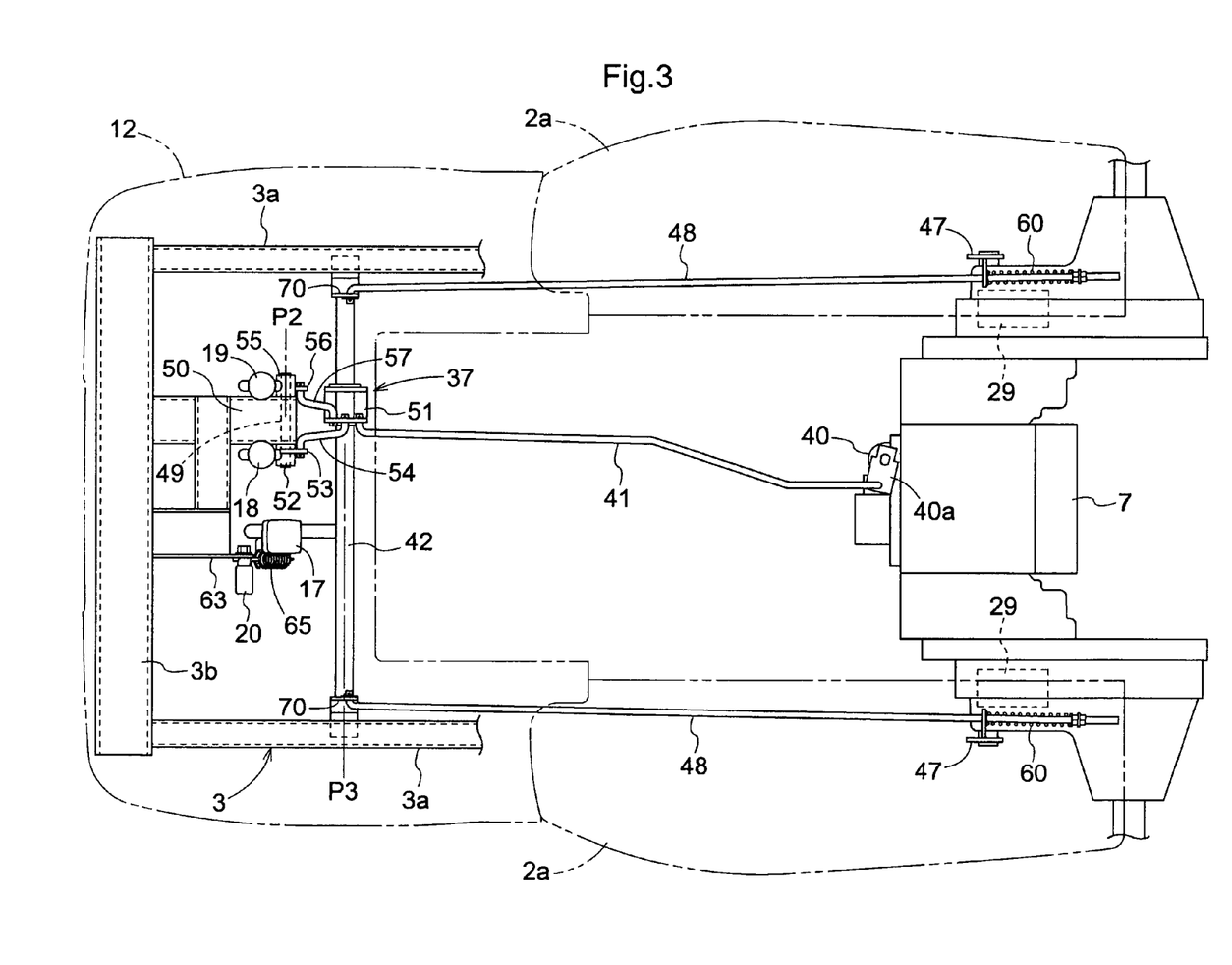
FIG. 3 is a plan view in section showing a lifting/lowering control pedal linking mechanism.
Figure 4:
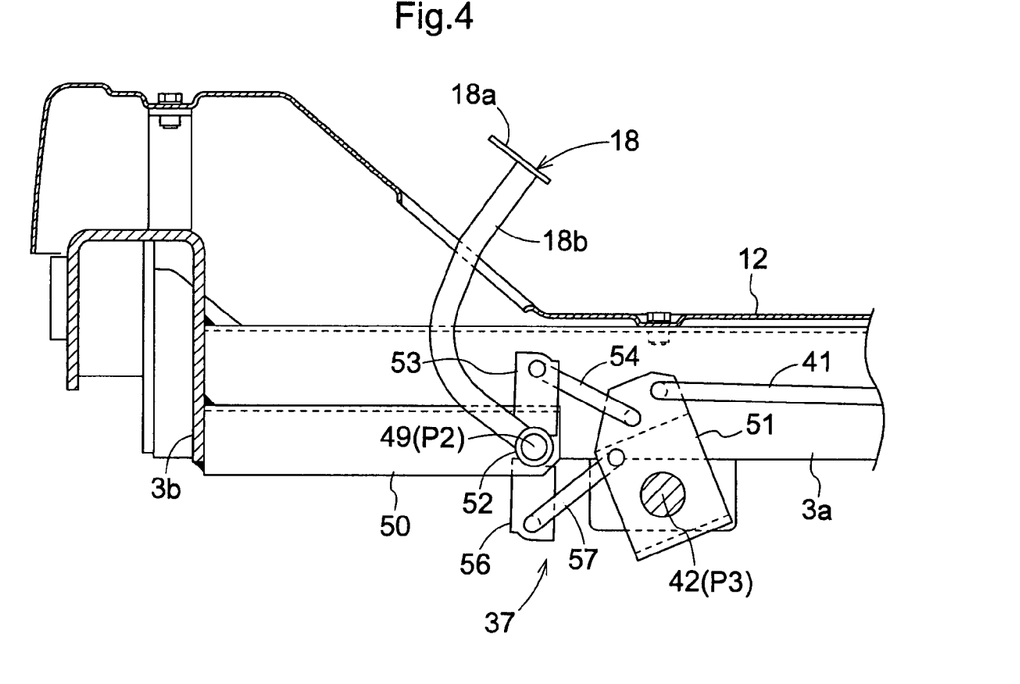
FIG. 4 is a side view in vertical section showing the lifting/lowering control pedal linking mechanism.
Figure 5:
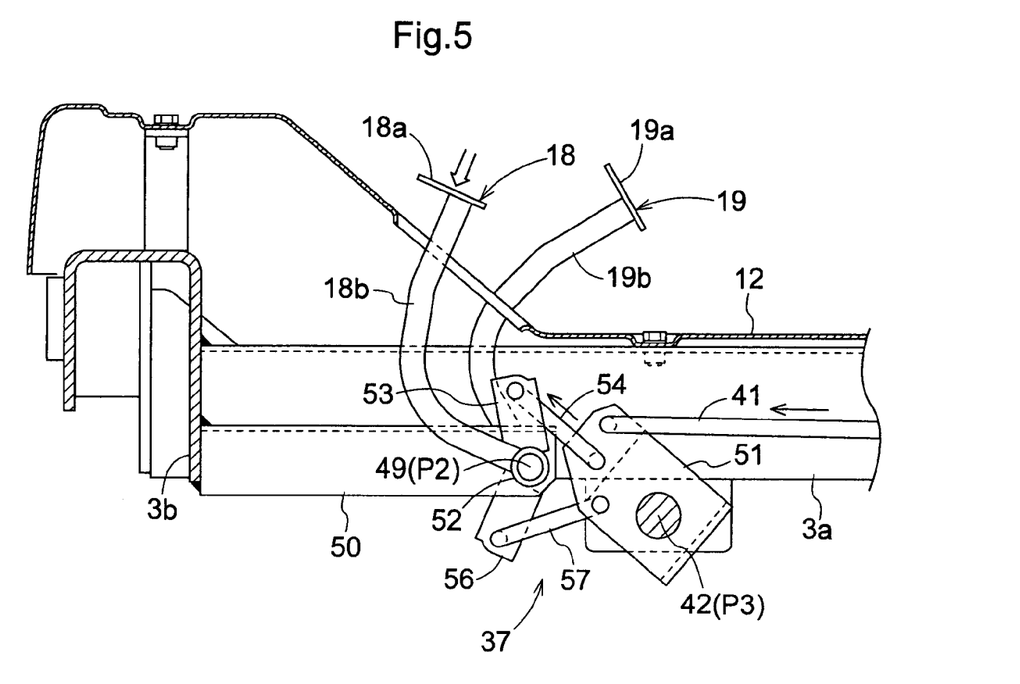
FIG. 5 is a side view in vertical section showing linking conditions of lifting and lowering control pedals.

As shown in FIGS. 3 through 5, a lifting/lowering control pedal linking mechanism 37 comprises the lifting control pedal 18 consisting of a lifting stepping face 18a and a pipe 18b, the lowering control pedal 19 consisting of a lowering stepping face 19a and a pipe 19b, a bracket 50 having the front end thereof affixed to a vehicle frame 3b disposed on the front side of the vehicle body and fixedly mounting a pedal support shaft 49 at a rear portion thereof, an arm 51 rotatably supported to an arm support shaft 42 which in turn is pivotally supported to right and left vehicle frames 3a, etc.

Referring to the lifting control pedal 18, the lower end of this pedal is affixed to a left boss portion 52 which is pivotally attached to a pedal support shaft 49 fixed the bracket 50 to be pivotable about a lateral axis P2. To an upper portion of the left boss portion 52, there is affixed a lifting control pedal arm 53. And, to an upper portion of this lifting control pedal arm 53, one end of a lifting control pedal rod 54 is operatively connected and the other end of the lifting control pedal rod 54 is operatively connected to the arm 51.

On the other hand, referring to the lowering control pedal 19, the lower end of this pedal is affixed to a right boss portion 52 which is pivotally attached to the pedal support shaft 49 fixed the bracket 50 to be pivotable about the lateral axis P2. To a lower portion of the right boss portion 55, there is affixed a lowering control pedal arm 56. And, to a lower portion of this lowering control pedal arm 56, one end of a lowering control pedal rod 57 is operatively connected and the other end of the lowering control pedal rod 57 is operatively connected to the arm 51. To an upper portion of the arm 51, there is operatively connected a coupling rod 41 having a rear end thereof operatively coupled to a control arm 40a of a lifting/lowering valve 40.

To the lifting/lowering valve 40 provided at a front portion of the transmission case 7, the lifting/lowering cylinder 9 is connected via a hydraulic hose (not shown). In operation, as the control arm 40a pivotable about an axis extending vertical relative to the vehicle body is operated by the lifting control pedal 18 and the lowering control pedal 19, the mower 30 is lifted/lowered.

More particularly, as shown in FIG. 5, when the lifting control pedal 18 is stepped on, the lifting control pedal arm 53 affixed to the left boss portion 53 is pivoted counterclockwise as seen from the left side relative to the lateral axis P2, thereby rotating the arm 51 via the lifting control pedal rod 54 counterclockwise as seen from the left side relative to a lateral axis P3 to pull the coupling rod 41 forwardly, so that via the control arm 40a operatively connected to the rear end of this coupling rod 41, the lifting/lowering valve 40 is operated to the lifting side. On the other hand, when the lowering control pedal 19 is stepped on, the lowering control pedal arm 56 affixed to the right boss portion 55 is pivoted counterclockwise as seen from the left side relative to the lateral axis P2, thereby rotating the arm 51 via the lowering control pedal rod 57 clockwise as seen from the left side relative to the lateral axis P3 to push the coupling rod 41 rearwardly, so that via the control arm 40a operatively connected to the rear end of this coupling rod 41, the lifting/lowering valve 40 is operated to the lowering side. Incidentally, when the stepping-on operation of the lifting control pedal 18 or the lower pedal 19 is released, the lifting/lowering valve 40 will automatically return to its neutral condition, whereby the lifting or lowering movement of the mower 30 will be stopped.

Figure 6:
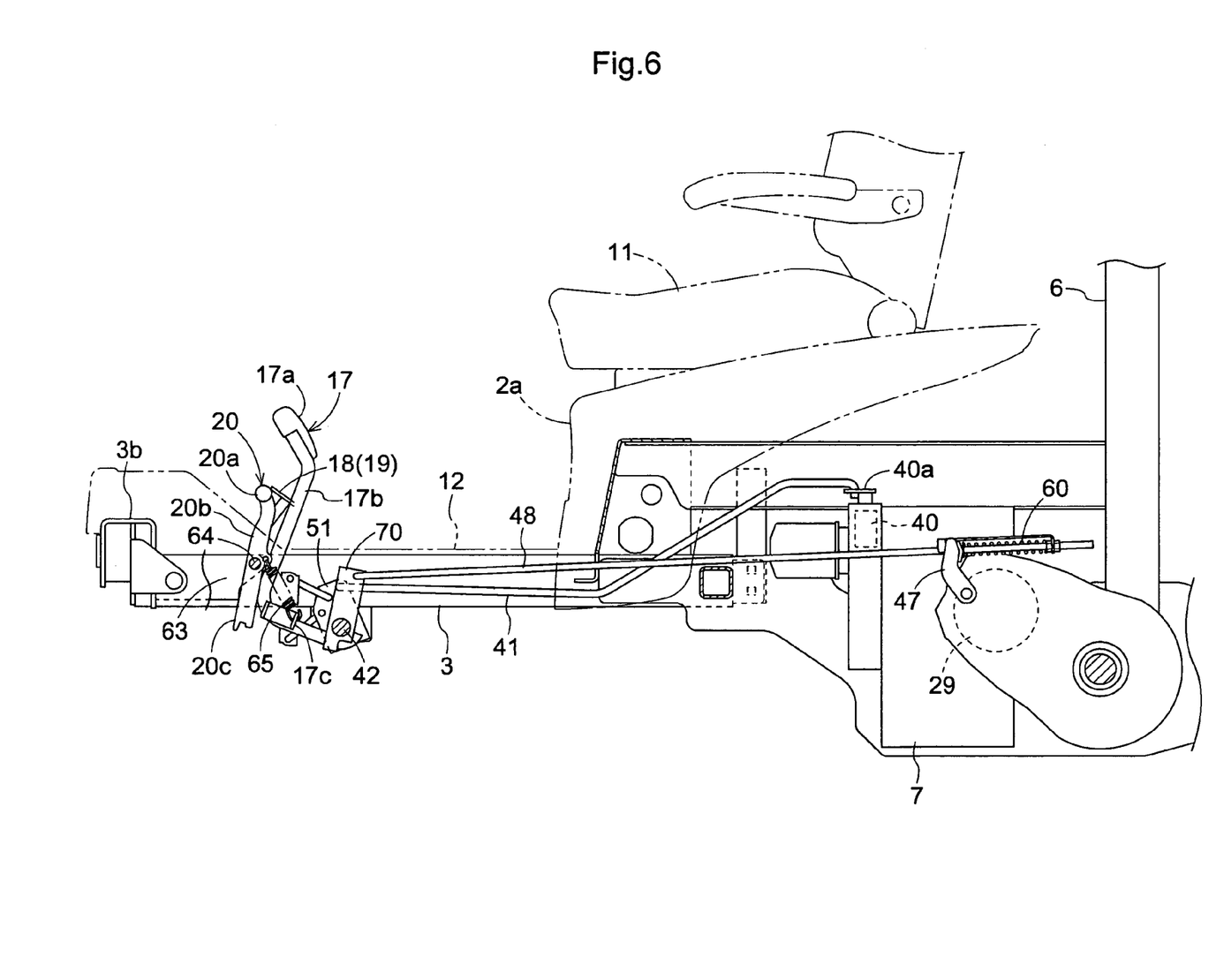
FIG. 6 is a side view in vertical section showing operative linking of a brake pedal.

As shown in FIG. 3 and FIG. 6, the brake pedal 17 consists of a braking stepping face 17a and a brake arm 17b. The brake arm 17b is fixed to the arm support shaft 42 rotatably supported to the right and left vehicle frames 3a, so that the brake arm 17b is rotatable together with the arm support shaft 42. To opposed end portions of the arm support shaft 42, side arms 70 are fixed to be rotatable in unison with this arm support shaft 42. To the side arms 70, there are operatively coupled coupling rods 48 having rear end portions thereof operatively coupled with control portions 47 of the right and left rear wheel brakes 29 provided on the opposed sides of the transmission case 7.

With use of the above-described construction in operation, when the brake pedal 17 is stepped on, the arm support shaft 42 is rotated counterclockwise as seen from the left side, whereby the side arms 70 affixed to the opposed ends of the arm support shaft 42 rotated counterclockwise as viewed from the left side, thus pulling forwardly the coupling rods 48 operatively coupled with the side arms 70, thereby activating the right and left rear wheel brakes 29. Incidentally, when the stepping-on operation of the brake pedal 17 is released, the rear wheel brakes 29 will be released by means of urging forces from springs 60 included in the right and left rear wheel brakes 29.

As shown in FIG. 2, on the left side of the brake pedal 17, there is provided the parking brake pedal 20. As shown in FIG. 6, the parking brake pedal 20 consists of a braking step-on portion 20a and an arm 20b. The arm 20b is supported to a bracket 63 affixed to the front vehicle frame 3b to be pivotable about a pivot axis 64. The arm 20b includes a hook 20c at the lower end thereof A spring 65 is provided between and across this arm 20b and an engaging piece 17c affixed to the brake pedal 17.

With use of the above-described construction in operation, if the parking brake pedal 20 is stepped on while the brake pedal 17 is being stepped on, the hook 20c of the parking brake pedal 20 will come into engagement with the engaging piece 17c of the brake pedal 17, thus maintaining the stepped-on condition of the brake pedal 17. Incidentally, under the above condition, if the brake pedal 17 is further stepped on, then, the engagement between the hook 20c and the engaging piece 17c will be released by the urging force from the spring 65, whereby the maintenance of the stepped-on condition of the brake pedal 17 will be released.

Figure 7:
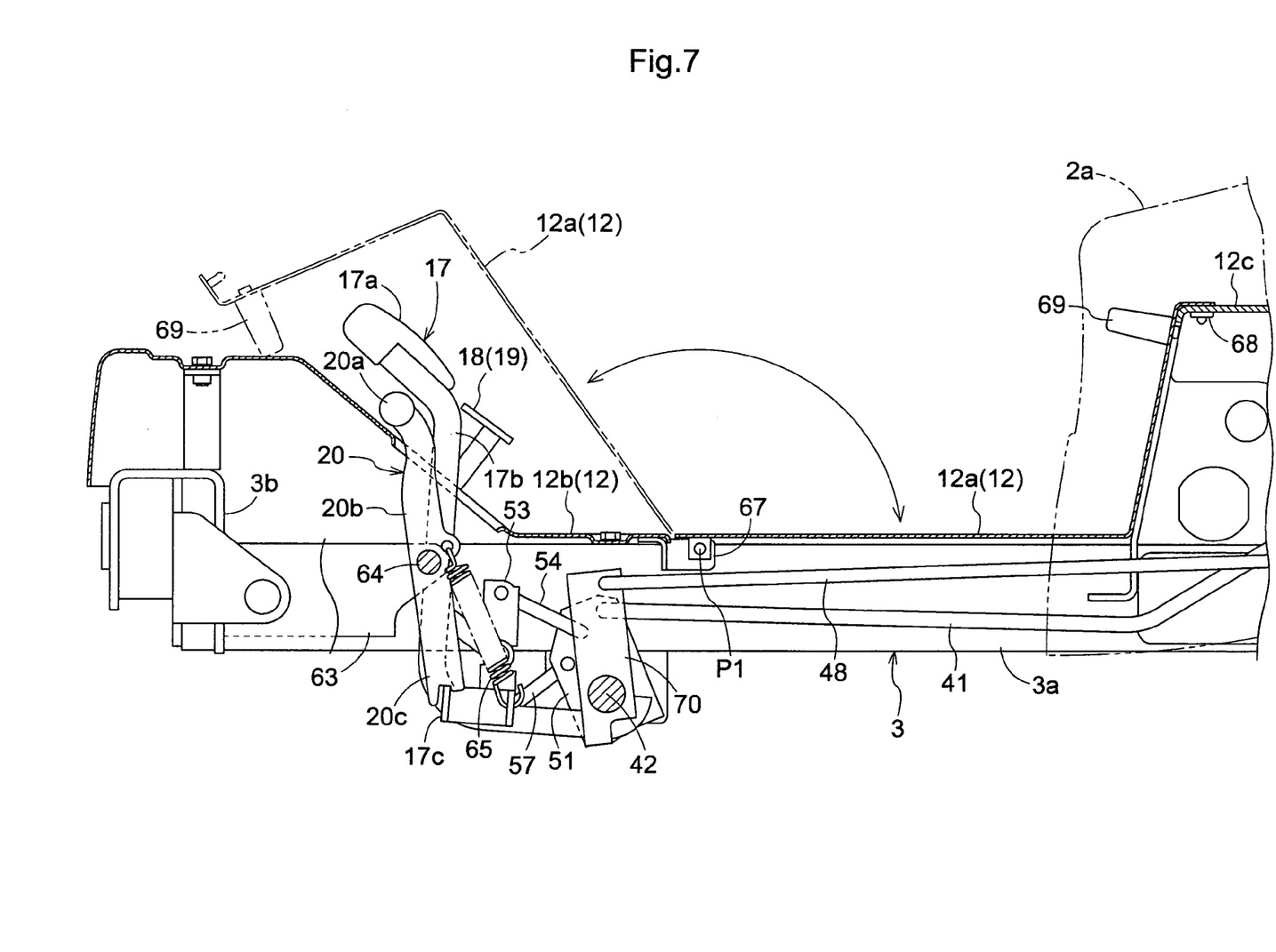
FIG. 7 is a side view in vertical section showing an opening/closing construction of an opening/closing portion of a driving section floor.

As shown in FIG. 2 and FIG. 7, the driving section floor 12 consists of an opening/closing portion 12a and a fixed portion 12b. The opening/closing portion 12a is formed of a steel plate having an L-shape in its side view. A front end of the opening/closing portion 12a is secured to the fixed portion 12b via a hinge 67 pivotable about the lateral axis P1 and a rear end of this opening/closing portion 12a is secured via a locking device 68 to a floor 12c provided downwardly of the driver's seat 11. At a rear center portion of the opening/closing portion 12a, there is provided an opening/closing handle 69. In operation, when the lock device 68 provided rearwardly of the opening/closing portion 12a is released and the handle 69 is pulled forwardly, the opening/closing portion 12a will be pivoted about the lateral axis P1 of the hinge 67, the under-floor space of the driving section 10 will be opened up, for allowing inspection or repair of the upper face side of the cutter blade housing 31 from above the traveling vehicle body.

The two-dotted line in FIG. 7 shows such opened condition of the opening/closing portion 12a. As shown, if the brake pedal 17 is stepped on and this stepped-on condition is maintained by the parking brake pedal 20 and then the opening/closing portion 12a is opened under this condition, all of the lowering control pedal 19, the lifting control pedal 18, the braking pedal 17 and the parking pedal 20 can be covered with the opening/closing portion 12a. Therefore, it is possible to prevent inadvertent releasing of the stepped-on condition of the brake pedal 17 due to an accidental step-on operation of the brake pedal 17 during an inspection or maintenance and to prevent also erroneous operations of the lowering control pedal 19 and the lifting control pedal 18. Consequently, the work efficiency of the inspection and maintenance operation can be improved.

First Alternative Embodiment of the Invention

In the foregoing embodiment, for lifting/lowering the mower 30, the lifting control pedal 18 and the lowering control pedal 19 are affixed to be pivotable about the lateral axis P2 extending along the right/left direction of the vehicle body. Instead of this, an alternative pedal construction as shown in FIG. 8 can be employed.

Figure 8:
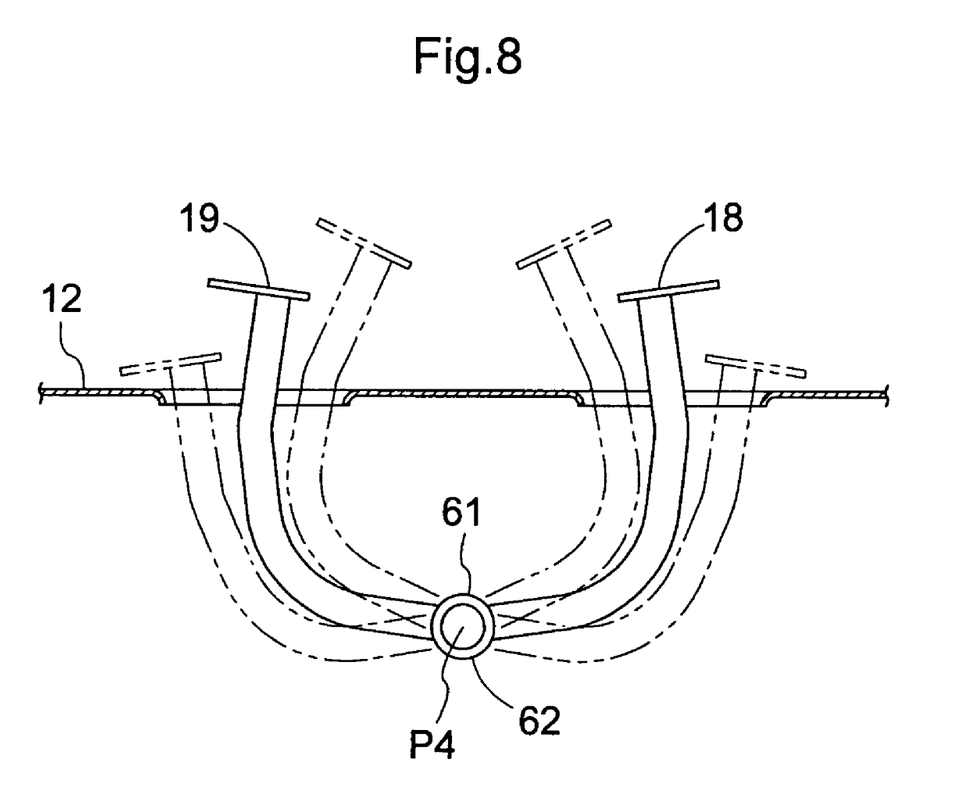
FIG. 8 is a schematic showing lifting and lowering control pedal portions relating to a first alternative embodiment of the invention.

As shown in FIG. 8, a tubular shaft 62 is provided to be pivotable about an axis P4 extending along the fore and aft direction of the vehicle body. And, to left and right portions of this tubular shaft 62, the lowering control pedal 19 and the lifting control pedal 19 are secured. In association with a pivotal movement of the tubular shaft 62, an operational shaft 61 is moved along the fore and aft direction of the vehicle body. Further, this operational shaft 61 is operatively coupled with the control arm 40a of the above-described lifting/lowering valve 40 via an operative coupling mechanism (not shown), so as to lift/lower the mower 30.

Second Alternative Embodiment of the Invention

In the foregoing embodiment, there was described the riding type lawn mower vehicle (so-called "zero-turn mower") in which the mower is connected via the lifting/lowering link mechanism 13 between the caster-wheel type freely rotatable front wheels 1 and the drivable rear wheels 2. Instead, the invention may be applied to e.g. a so-called front mounted mower mounting a mower at a front portion thereof.

Third Alternative Embodiment of the Invention

In the foregoing embodiment, the lowering control pedal 19, the lifting control pedal 18 and the brake pedal 17 are arranged from the right side in this mentioned order. However, the disposing order of the respective pedals is not particular limited.

What is claimed is:

1. A riding lawn mower vehicle having a riding traveling vehicle body and a mower operatively connected via a lifting/lowering link mechanism to the vehicle body to be lifted and lowered relative thereto, the mower vehicle comprising:
   a pair of right and left hand-operated traveling control members;
   a lifting control pedal having a lifting stepping face and configured to cause the mower to be lifted;
   a lowering control pedal having a lowering stepping face and configured to cause the mower to be lowered; and
   the lifting stepping face and the lowering stepping face being located laterally to each other on a floor of a driving section of the riding traveling vehicle body.

2. The riding lawn mower vehicle according to claim 1, further comprising a coupling mechanism for operatively coupling the lifting control pedal and the lowering control pedal, the coupling mechanism being configured such that the lowering stepping face is elevated when the lifting stepping face is stepped on, whereas when the lowering stepping face is stepped on, the lifting stepping face is elevated.

3. The riding lawn mower vehicle according to claim 1, further comprising:
   a brake pedal for operating a brake;
   a braking stepping face of the brake pedal, the lifting stepping face of the lifting control pedal and the lowering stepping face of the lowering control pedal are located laterally to one another in the lateral direction of a driving section of the riding traveling vehicle body.

4. The riding lawn mower vehicle according to claim 1, wherein the driving section of the riding lawn mower vehicle has an inclined face at a front portion thereof, said lifting control pedal and said lowering control pedal each having a portion extending through an opening defined in said inclined face.

5. The riding lawn mower vehicle according to claim 1, further comprising:
   a pedal support shaft supported to the vehicle body for pivotally supporting said lifting control pedal and said lowering control pedal;
   a lifting boss portion fixed to one end of said lifting control pedal and pivotable about said pedal support shaft;
   a lowering boss portion fixed to one end of said lowering control pedal and pivotable about said pedal support shaft;
   a lifting control pedal arm fixed to said lifting boss portion and extending in one of an upward direction and a downward direction from said pedal support shaft;
   a lowering control pedal arm fixed to said lowering boss portion and extending in the other of the upward direction and the downward direction from said pedal support shaft;
   a connecting arm support shaft supported to the vehicle body;
   a connecting arm supported by the connecting arm support shaft;
   a lifting control pedal connecting member having one end thereof connected to said lifting control pedal arm and the other end thereof connected to said connecting arm; and
   a lowering control pedal connecting member having one end thereof connected to said lowering control pedal arm and the other end thereof connected to said connecting arm.

6. The riding lawn mower vehicle according to claim 5, further comprising a drive coupling member having one end thereof connected to a position of said connecting arm offset from said connecting arm support shaft, the other end of said drive coupling member being connected to a control arm of a valve for operating a lifting/lowering cylinder.

7. The riding lawn mower vehicle according to claim 6, wherein said drive coupling member includes a first portion which extends substantially horizontally and a second portion which extends continuously from a rear end of said first portion and extends upwardly with respect to said first portion.

8. The riding lawn mower vehicle according to claim 1, wherein said lawn mower vehicle includes an engine and a driver's seat disposed forwardly of the engine.

* * * * *